Nov. 16, 1937.                J. W. LOGAN, JR                    2,099,428
                             TRAIN BRAKE SYSTEM
                         Filed Feb. 29, 1936           4 Sheets—Sheet 4

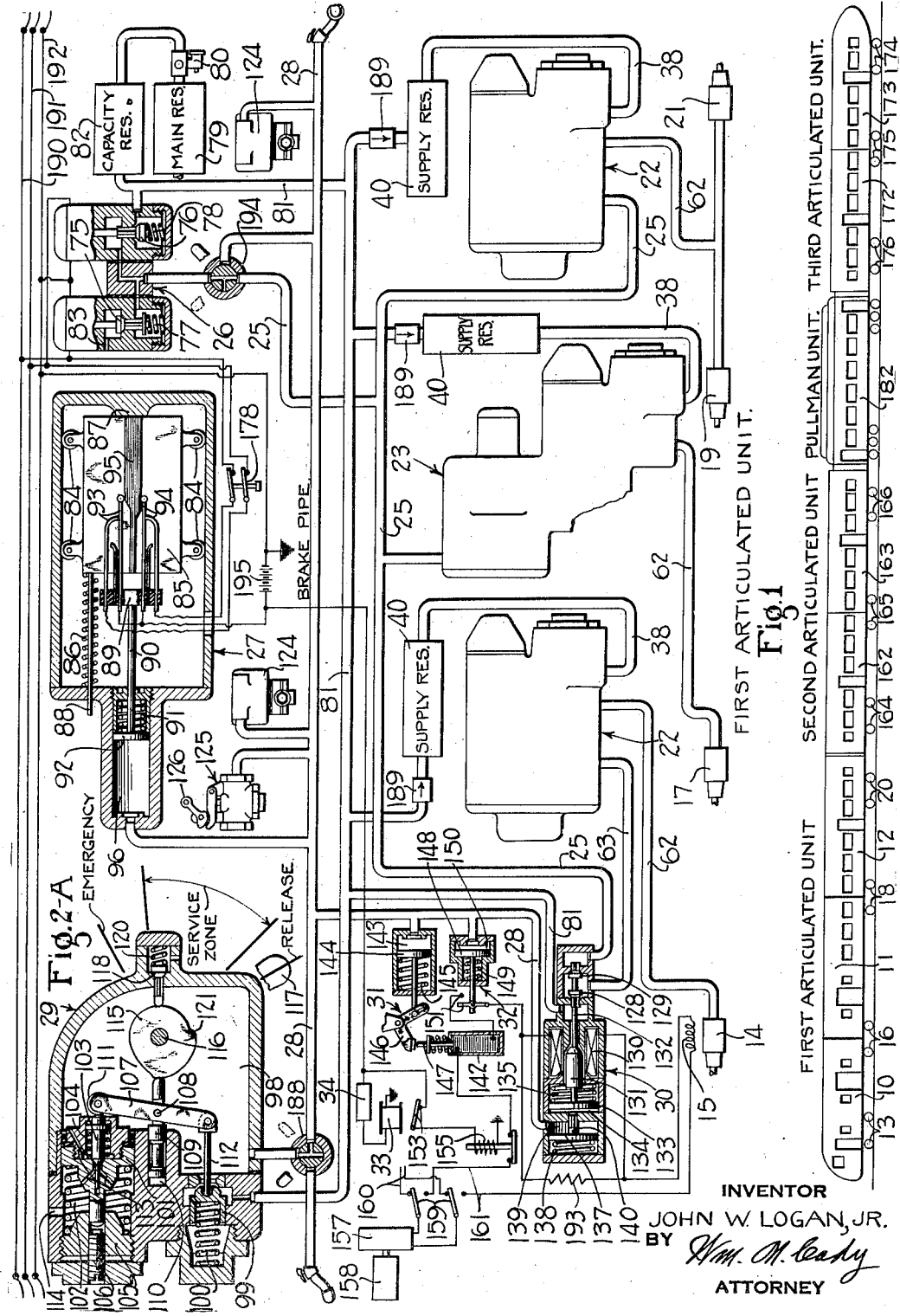

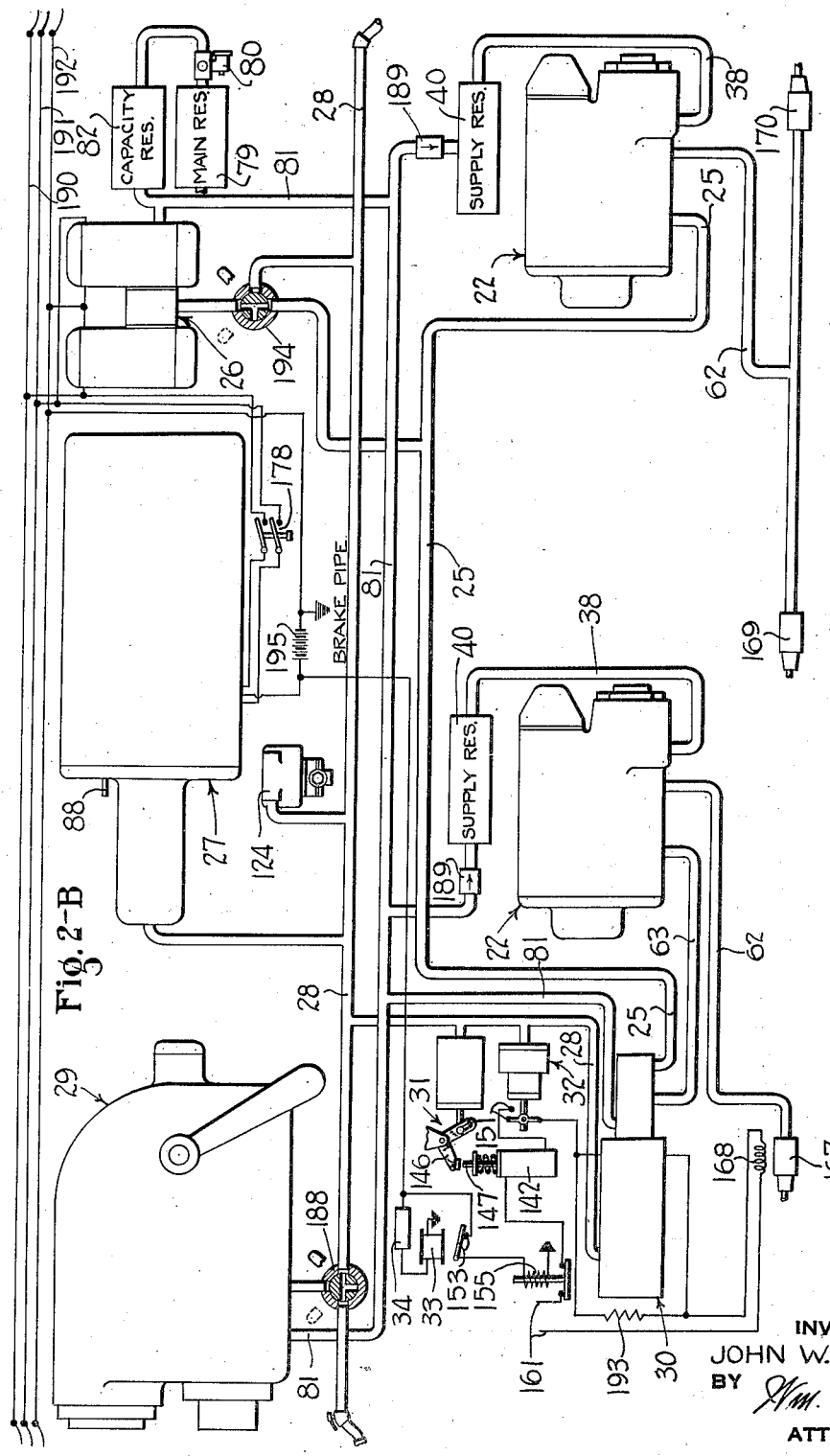

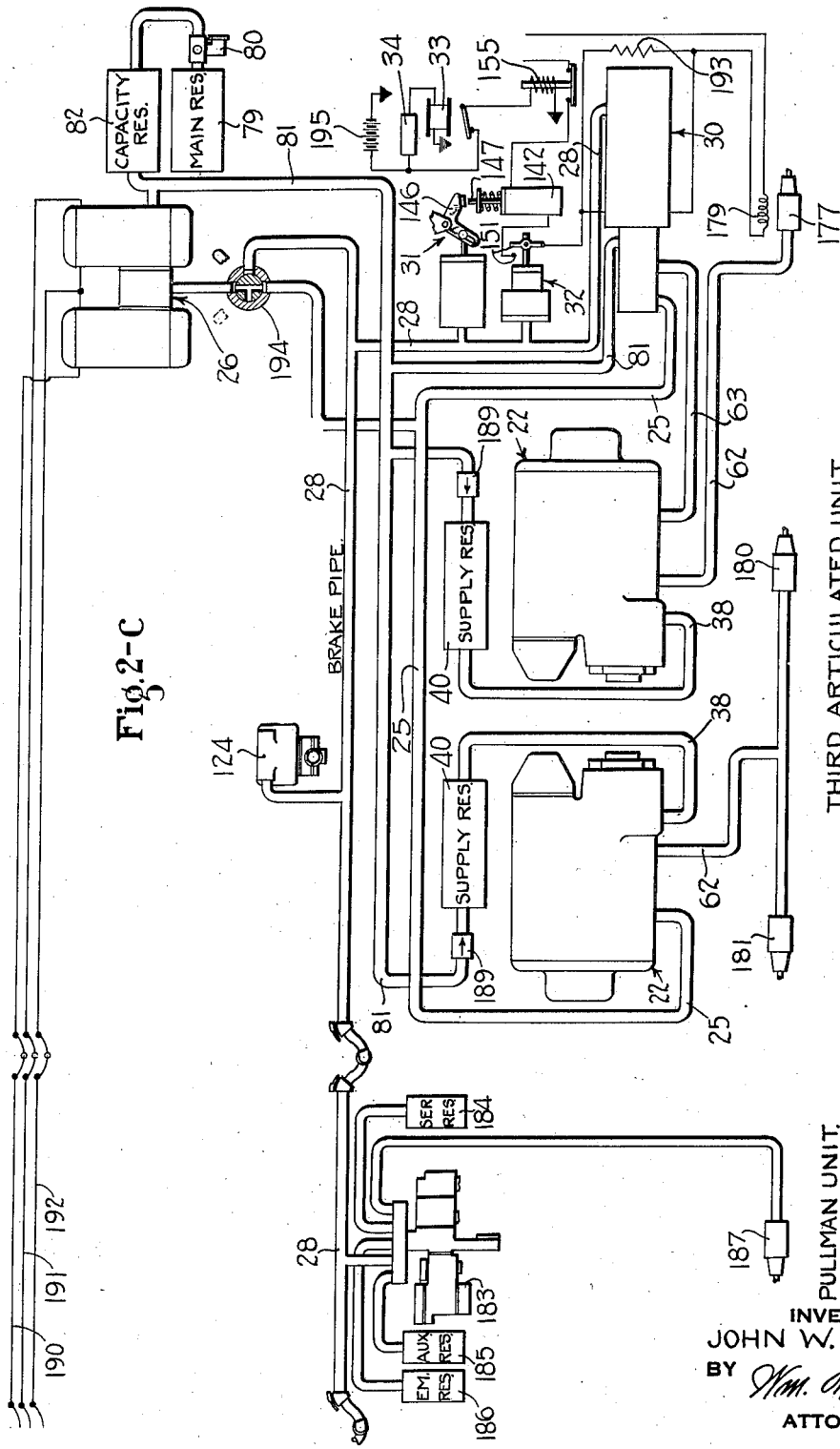

INVENTOR
JOHN W. LOGAN, JR
BY Wm. N. Cady
ATTORNEY

Patented Nov. 16, 1937

2,099,428

UNITED STATES PATENT OFFICE 2,099,428

TRAIN BRAKE SYSTEM

John W. Logan, Jr., Forest Hills, Pa., assignor to The Westinghouse Air Brake Company, Wilmerding, Pa., a corporation of Pennsylvania Application February 29, 1936, Serial No. 66,417

29 Claims. (Cl. 303—3)

This invention relates to train brake systems, and more particularly to brake systems for high speed trains.

In recent years a number of light weight passenger trains have been designed to operate at what have heretofore been considered extremely high speeds. These trains have been principally of the articulated type, comprising a relatively heavy motor or power car coupled through articulations to a series of relatively light weight, trailer cars. For the most part these trains have been designed for operation as independent units, without regard to operation in conjunction with similarly designed trains. As a consequence, when and if it is desired to couple one or more of these trains together so as to operate them in combination as a single train, difficulties may be encountered in operating the brake equipments on the several units from a single unit, or such a plan may not be at all possible due to wide differences in principle of operation of the brake equipments on the several units.

The desirability and necessity for operating at times independent trains coupled together is well recognized. It is, therefore, of great practical importance that newly designed high speed passenger trains should be provided with brake equipments which will permit such coupling, and operation of the brake equipment on each individual unit from another unit in the combination train. Accordingly, therefore, it is a principal object of the present invention to provide a brake equipment for high speed trains operating upon a principle which will permit a plurality of individual trains, or single vehicles, each of which employs this equipment or one similar or dissimilar but operating on the same general principle as this type, to be coupled together and the brakes throughout the combination operated from one unit in the combination.

Practically all modern standard passenger railway vehicles are provided with brake equipments which operate upon reduction of pressure in a normally charged pipe (called a brake pipe) to apply the brakes, and which operate upon a subsequent increase of pressure in this pipe to release the brakes. This principle of operation has throughout many years of experience proven to be the most desirable. It is, therefore, a further object of my invention to provide an improved brake equipment for high speed trains which operates upon the principle of reduction of pressure in a normally charged pipe, so that trains provided with such an equipment may be coupled to trains or individual vehicles employing the present standard fluid pressure brake equipments and operate in harmony therewith under control from a single control unit.

In the modern light weight, high speed trains the motor car is considerably heavier than any one of the trailer cars. The increased weight of the motor car over a trailer car is essentially due to the power unit on this car. Because of the greater weight of the motor car considerably greater braking is required to stop this car than is required to stop any one of the trailer cars.

The motive power for these modern high speed trains consists of motors located on certain of the trucks of the motor or power car and suitably geared to the axles thereof. These motors receive power from a generator on the motor car which is driven by some economical form of prime mover, such for example as a Diesel engine. In order to produce the required braking on the motor car, at the high speeds, it has heretofore been proposed to employ some form of electro-dynamic brake, such for example as the eddy-current brake, preferably located on extensions of the motor shafts.

As is well known, the eddy-current brake will more readily produce higher retarding forces at the high speeds than the familiar fluid pressure operated friction type brake. It is also characteristic of an eddy-current brake that the braking effect produced is substantially a function of the current supplied to the energizing windings of the brake, and that this type can be designed to produce a substantially constant braking effect for any degree of energizing current so long as the train speed is higher than some minimum value, as for example eight or ten miles per hour. Below this speed, the braking effect begins to decrease, first slowly then rapidly, until at zero speed the eddy-current brake produces no braking effect at all.

In accordance with these considerations, it is a further object of this invention to provide an improved type of brake equipment employing both electric and fluid pressure brakes, both of which may be applied upon reduction of pressure in a normally charged control pipe.

When trains are operated at relatively high speeds, it is desirable when stopping that they be decelerated uniformly so as to avoid discomfort to the passengers and dangerous shocks throughout the train. In addition, it is further desirable that the deceleration be at some rate below that which would produce sliding of the wheels. To accomplish this it is necessary that means be provided for controlling the rate of retardation due to an application of the brakes, and it is preferable that this means operates in response to reductions of pressure in a normally charged control pipe.

Accordingly, therefore, it is a yet further object of the invention to provide an improved brake equipment particularly adapted for high speed passenger trains operating upon reduction of pressure in a normally charged pipe, in which the degree of braking is limited or controlled by a retardation controller mechanism adjusted according to reductions in pressure in the normally charged pipe.

The conditions under which modern light weight, high speed passenger trains operate are somewhat different from those of the present standard trains. For example, the load on the driving trucks of the motor car is practically constant, whereas the load on the trailer trucks will vary over a wide range, and particularly on those trucks which are associated with the baggage or express car in the train. Accordingly, it is a further object of this invention to provide an improved form of brake equipment particularly suitable for high speed trains of the articulated type and the conditions under which these trains operate.

And it is a still further object of the present invention to provide an improved brake equipment embodying detail features, as will hereinafter be more fully pointed out, which permit of a more universal interchange of train units without sacrificing either safety or flexibility of operation.

These and other objects will be more fully appreciated from the following description of one embodiment of my invention, which is illustrated in the attached drawings, wherein, Fig. 1 illustrates in schematic form one combination of a plurality of independent trains, or train units, which may be coupled in combination to produce a combination train.

Fig. 2—A illustrates in schematic and diagrammatic form a proposed brake equipment embodying my invention, for the first articulated unit of the train illustrated in Fig. 1.

Fig. 2—B similarly illustrates a like brake equipment for the second articulated unit in the train of Fig. 1.

Fig. 2—C illustrates in schematic and diagrammatic form brake equipments for both the Pullman unit and the third articulated unit of the train shown in Fig. 1.

Figure 3:
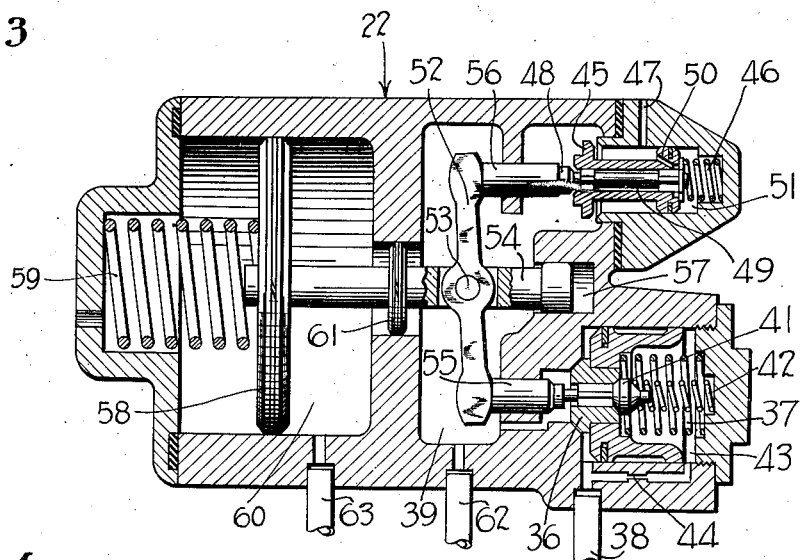
Fig. 3 is a diagrammatic view of a relay valve device employed in the brake equipments for the articulated units in the train of Fig. 1.

The combination of trains and train units shown in Fig. 1 is intended to be merely illustrative of one of many such combinations which may be effected. The brake equipments illustrated in Figs. 2—A, 2—B and 2—C for the first, second and third articulated units, respectively, have been illustrated as employing similar devices, for the purpose of simplifying the understanding of the invention. It is to be understood however that these several brake equipments need not be essentially duplicates of each other so long as they operate upon the principle disclosed in this embodiment of my invention, and embody the means hereinafter described to insure the proper operation of the several brake equipments on the several units when controlled from a single unit.

The brake equipment illustrated in Fig. 2—A for the first articulated unit will be described first, and the brake equipments illustrated in Figs. 2—B and 2—C for the second and third articulated units will then be described with reference to this first equipment. Thereafter, the brake equipment illustrated in Fig. 2—C for the Pullman unit will be described.

*First articulated unit*

The first articulated unit, as illustrated in Fig. 1, comprises a motor or power car 10, a combination baggage and passenger car 11, and a passenger car 12. As shown in Fig. 1, the motor car 10 is provided with a traction truck, indicated by the wheels 13, which is equipped with the driving motors. The friction brakes on the wheels of this truck are operated by fluid under pressure supplied to a brake cylinder 14. In addition, eddy-current brakes, indicated by winding 15, are provided on extensions of the shafts of the driving motors.

The motor car is coupled to the second car 11 through an articulated truck represented by the wheels 16. The brakes on these wheels are operated by the brake cylinder 17.

The second car 11 is connected to the car 12 by an articulated truck represented by wheels 18. The brakes on these wheels are operated by a brake cylinder 19. The rear of the car 12 is supported by a non-articulated truck represented by wheels 20. The brakes on these wheels are operated by a brake cylinder 21.

The supply of fluid under pressure to and its release from the brake cylinder 14 is controlled by a relay valve device 22, and the supply of fluid under pressure to and its release from the brake cylinders 19 and 21 is controlled by a like relay valve device 22. However, because the load on the first articulated truck, represented by wheels 16, varies over a much wider range than the load on the other trucks, the supply of fluid under pressure to and its release from the brake cylinder 17 is controlled by a load compensating relay valve device 23. The load on the first articulated truck varies widely, because the rear portion of the motor car 10, and the front portion of the second car 11, are respectively the mail and express or baggage portions of the train.

Operation of the relay valve devices 22 and 23 is controlled by variation of pressure in a control pipe 25. The variation of pressure in this pipe is controlled by application and release magnet valve device 26, which in turn is controlled by a retardation controller device 27.

Retardation controller device 27 is controlled according to variations of pressures in a brake pipe 28, and the pressure in the brake pipe 28 is varied by operation of a brake valve device 29.

For the purpose of suppressing the friction brakes on the power truck of the motor car 10, represented by wheels 13, when applying the eddy-current brakes on this truck, there is provided an electroresponsive valve device 30. And for the purpose of controlling the degree of application of the eddy-current brakes according to the variations of pressure in the brake pipe 28, there are provided a rheostat mechanism 31, and a fluid pressure operated switch device 32.

In order that the eddy-current brakes shall be deenergized at or near the end of the stop, at which time the fluid pressure brakes on this truck are cut into action, there are provided motion detector devices 33 and 34.

Considering now more in detail the devices above enumerated, and referring particularly at first to Fig. 3, the relay valve device 22 is embodied in a casing having a supply valve 36 urged toward a seated position by a spring 37. This supply valve controls communication between a supply pipe 38 and a chamber 39. The supply pipe 38 leads to a supply reservoir 40 which is normally charged with fluid under pressure, as will be more fully described later.

Associated with the supply valve 36 is a pilot valve 41, urged toward a seated position by a spring 42. The pilot valve 41 controls communication between a chamber 43, to the right of the supply valve 36, and the chamber 39.

The valve chamber 43 is also in communication with the supply pipe 38 by way of a restricted passage 44. When the pilot valve 41 is seated, the pressure urging the supply valve 36 to seated position is that due to the combined pressure of spring 37 and the pressure of fluid in the chamber 43.

When the pilot valve 41 is unseated fluid under pressure in the chamber 43 is permitted to escape to the chamber 39, and as this reduces the pressure holding supply valve 36 upon its seat this valve may then be unseated by a much lower force or pressure applied to its left end.

The relay valve device 22 is also provided with a release valve 45 which is urged toward an unseated position by a spring 46. This release valve controls communication between the chamber 39 and the atmosphere, by way of a passage 47.

The release valve 45 is provided with a pilot valve 48, which is also urged to unseated position by the aforementioned spring 46. When both the release valve 45 and the pilot valve 48 are seated, the communication to the atmosphere from chamber 39 is cut off. When the release valve 45 is seated and the pilot valve 48 is unseated, a communication is established to the atmosphere from chamber 39, past the unseated pilot valve 48, past the fluted pilot valve stem 49, and through port 50 and passage 47.

The port 50 is a restricted port, so that as fluid under pressure flows past the fluted stem 49 into chamber 51 the pressure in this chamber builds up rapidly to a value corresponding substantially to the pressure in chamber 39. The pressure thus acting on the right side of the body of the release valve 45, together with that from spring 46, easily unseats release valve 45 when the seating pressure applied to the left of the valve is removed. The release valve 45 is thus caused to be quickly unseated to quickly release fluid under pressure from chamber 39 to the atmosphere.

For controlling seating and unseating of the supply valve 36, and seating and unseating of the release valve 45, and their respective pilot valves, there is provided a mechanism comprising a lever 52 pivotally mounted intermediate its ends at 53 to a stem 54. The lower end of the lever 52 engages a plunger 55, which slides in the casing, to engage upon movement to the right, first the stem of the supply pilot valve 41, and when this valve has been unseated to then engage the supply valve 36.

The upper end of the lever 52 engages a second plunger 56, which also slides in the casing and upon movement to the right engages first the release pilot valve 48, to seat this valve, and then engages the release valve 45.

The stem 54 is at its right end slidable in a bore 57 in the casing, and has connected to its left end a piston 58 subject on its left side to pressure of a calibrated spring 59, and on its right side to pressure of fluid under pressure in a chamber 60. Intermediate its ends the stem 54 has secured thereto a smaller piston 61, which is subject on its left side to pressure of fluid in chamber 60, and on its right side to pressure of fluid in chamber 39.

The chamber 39 is connected by pipe 62 to the brake cylinder 14, while the chamber 60 is, in the case of the valve device on the truck of car 10, connected by a pipe 63 to the control pipe 25, through the electroresponsive valve means 30. In the case of the valve device 22 on car 12, the chamber 60 is connected directly to the control pipe 25.

In order to render more clearly the operation of this relay valve device, and other mechanisms to be hereinafter described, specific reference will be made to definite fluid pressures, but it is to be understood that these references are by way of illustration, and that the devices and apparatus herein described may be designed to operate at other suitable pressures.

Considering now the relay valve device 22 with this in mind, the parts are so designed that when a pressure of 105 pounds is present in chamber 60, with atmospheric pressure present in chamber 39, the parts will be positioned as shown in Fig. 3. As the pressure in chamber 60 is diminished piston 58 will be urged to the right by spring 59. This will cause stem 54 to also move to the right, and as a consequence the lever 52 will fulcrum about its lower end to first seat the release pilot valve 48 and then the release valve 45. Following this, the lever 52 will fulcrum about its upper end to first unseat the supply pilot valve 41, and then the supply valve 36. It is to be understood that the release valve spring 46 and supply spring 37 are proportioned to permit this sequence of operation.

Seating of the two release valves will close the communication from chamber 39 to the atmosphere, while unseating first of the supply pilot valve 41 will unload the supply valve 36, that is, reduce the pressure holding the valve seated, whereupon the valve may be quickly unseated by movement of lever 52. Fluid under pressure will then be supplied from the supply pipe 38 to chamber 39.

From this chamber fluid under pressure will flow by way of pipe 62 to the brake cylinder 14. At the same time, the pressure of fluid acting on the right side of piston 61 will tend to counterbalance the movement of stem 54 to the right. It is intended that for service applications of the brakes the pressure in chamber 60 will be reduced from some value above 105 pounds, as for example from 110 to 115 pounds, down to a minimum of 85 pounds, the latter pressure representing a full service application.

It will thus be apparent that for various combinations of pressures in chambers 60 and 39 the two pistons 58 and 61 will overbalance the pressure exerted by spring 59 and actuate the parts to effect seating of the supply valve 36, to lap the supply to chamber 39. For example, a pressure of 85 pounds in chamber 60 and a pressure of 60 pounds in chamber 39 will effect such a lap, the 60 pounds in chamber 39 representing the maximum brake cylinder pressure for a service application.

When the pressure in chamber 60 is restored to some value above 105 pounds it will be obvious that not only will the supply valve 36, and its pilot valve 41, be seated, but the release pilot valve 48 will be unseated, followed by rapid unseating of the main release valve 45, to release fluid under pressure from chamber 39, and brake cylinder 14, to the atmosphere.

The relay valve device 22 on the car 12 is a duplicate of that on the car 10, and controls the supply of fluid under pressure to and its release from the brake cylinders 19 and 21 in a like manner to that just described for the brake cylinder 14.

Figure 4:
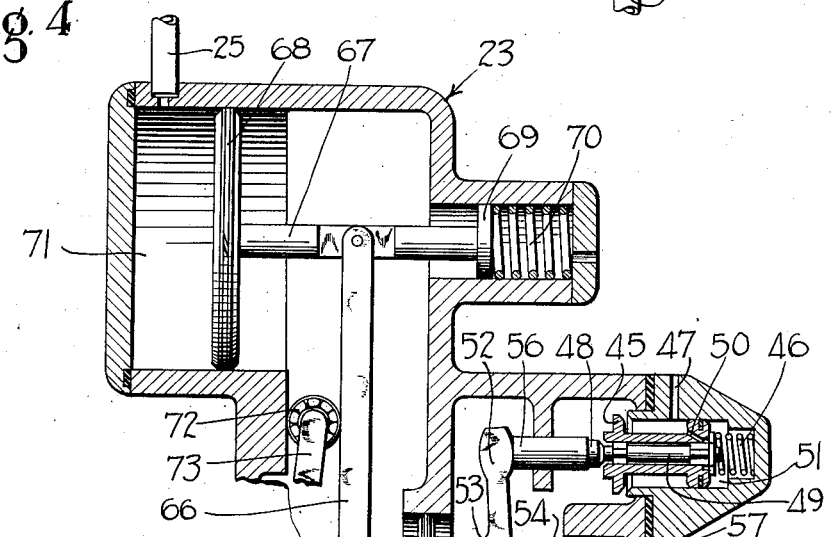
Fig. 4 is a diagrammatic view of a load compensating relay valve device particularly intended for the brake equipment of the first articulated unit of the train in Fig. 1.

The load compensating relay valve device 23, as shown in Fig. 4, is similar to the relay valve device 22, differing therefrom principally in the control of operation thereof. Since these valve devices are alike in many respects the like parts have been designated by like numerals.

The stem 54 of the valve device 23 is provided with a finger 65 engaging a notched end of a lever 66, which is pivoted at its other end to a rod 67 carried by a piston 68 and a movable abutment 69. A calibrated spring 70 acts upon the movable abutment 69 to urge the stem 67 to the left. The piston 68 attached to the stem 67 is subject on its left side to pressure of fluid in a chamber 71, which is connected to the control pipe 25.

The lever 66 is rotatable about a movable fulcrum comprising a roller 72 carried by an arm 73, which positions the roller 72 according to the load on the vehicle, as for example in the manner shown and described in U. S. Patent No. 1,865,068 to U. A. Whitaker.

When the pressure in chamber 71 is equal to or greater than 105 pounds, the spring 70 will be compressed and the parts positioned as shown. When the pressure in chamber 71 is reduced, as for example to some value between 105 and 85 pounds, as for a service application, spring 70 shifts the piston 68 to the left, thus rocking lever 66 about the fulcrum or roller 72. This shifts the stem 54 to the right to perform the operations described in connection with the relay valve device 22. The relay valve device 23 thereafter functions as does the relay valve device 22, the essential difference being that the ultimate degree of fluid under pressure supplied to the connected brake cylinder 17 is determined by the position of the fulcrum or roller 72, and hence according to the vehicle load.

The application and release magnet valve device 26 is embodied in a casing comprising a vent valve 75 and a supply valve 76, the vent valve being urged toward unseated position by a spring 77, and the supply valve being urged toward a seated position by a spring 78. The vent valve 75 is maintained seated when an electromagnet (not shown) in the upper part of the casing is energized, while the supply valve 76 is maintained unseated when a similar electromagnet (not shown) is energized.

The control pipe 25 is connected to the application and release magnet valve device 26, and passages are provided such that when the vent valve 75 is seated and the supply valve 76 is unseated, the control pipe is charged from a main reservoir 79, by way of a feed valve device 80, a connected feed valve pipe 81 and capacity reservoir 82. The control pipe is charged to a pressure corresponding to the setting of the feed valve device 80. The capacity reservoir 82 is provided to add volume and hence capacity to the system.

When the supply valve 76 is seated the charging of the control pipe is terminated, and when simultaneously therewith the vent valve 75 is unseated the control pipe is vented to the atmosphere through an exhaust port 83.

The retardation controller device 27 is embodied in a casing having a body 85 adapted to roll therein on rollers 84. The rollers 84 are made as frictionless as possible, and roll in trackways in the casing. A spring 86 biases the body 85 normally to an inoperative position against a stop 87. The spring 86 is concentrically disposed on a rod 88, which has one end thereof secured to the body 85 and the other end thereof slidable in a bore in the casing.

Movable within the casing is an insulating member 89 carried by a rod 90, which is urged toward the left by a calibrated spring 91 reacting against a movable abutment 92 secured to this rod. The insulating member 89 carries a set of release contacts 93 and a set of application contacts 94, suitably insulated from each other as indicated in Fig. 2—A. These contacts are adapted to engage a cam 95 carried by the body 85.

In addition to being subject on its right hand side to pressure from spring 91, the movable abutment 92 is subject on its left hand side to pressure from a chamber 96. When the pressure in this chamber is maintained at or above 105 pounds, the movable abutment 92 is maintained in its extreme right hand position. When the pressure in chamber 96 is reduced spring 91 urges the movable abutment to the left, it reaching its extreme left hand position when the pressure in chamber 96 diminishes to or below 85 pounds.

As the movable abutment 92 moves to the left the contacts 93 and 94 are carried with it. These contacts are so designed that as the contacts 93 move out to engagement with the upper high part of cam 95 they are opened by their own resiliency. Similarly, when contacts 94 disengage from the lower high part of cam 95, they are likewise opened by their own resiliency.

The retardation controller device is so positioned on the vehicle that when the train is decelerating the force of inertia due to retarding of the train urges the body 85 to the left against opposition of spring 86, which is calibrated to permit the body 85 to move to the left according to the rate of retardation. After the contacts 93 and 94 have been actuated to some position to the left, therefore, the body 85 will under the force of inertia move to the left to first close the contacts 94, and then if the movement is far enough to close the contacts 93. Since the force of inertia acting on the body 85 corresponds to the rate of retardation, it will be obvious that by selectively positioning the contacts 93 and 94, the braking may be so controlled as to produce a desired rate of retardation. The parts are so designed that for reductions of pressure in chamber 96 between 105 and 85 pounds the contacts may be actuated to various positions between their extreme left hand and right hand positions.

The brake valve device 29 is embodied in a casing defining a chamber 98, and having a supply valve 99 urged toward a seated position by a spring 100. The supply valve 99 controls communication between the feed valve pipe 81 and the chamber 98.

Operatively mounted in a chamber in the casing is a movable abutment 101, subject on its right hand side to pressure of fluid in the chamber 98, and on its left hand side to pressure of a spring 102. Disposed interiorly of the movable abutment is a release valve 103 which is urged toward an unseated position by a spring 104.

For regulating the tension on the spring 102 there is provided a regulating member 105, and for limiting the movement of the movable abutment 101 to the left there is provided an adjustable set screw 106.

For unseating the supply valve 99 and for seating the release valve 103, there is provided a mechanism comprising spaced levers 107 mounted intermediate their ends at 108 on a carrier member 109. The carrier member 109 is disposed in a bore 110 in the casing, and is movable back and forth. At their upper ends the spaced levers 107 carry a roller 111 which engages the stem of release valve 103. Between their lower ends the spaced levers carry a rod 112 which engages the supply valve 99.

When the carrier member 109 is actuated to the left, as shown in the drawings, the spaced levers 107 are carried with it to seat the release valve 103 and unseat the supply valve 99. When the carrier member 109 is moved to the right, the spaced levers 107 will fulcrum about their upper ends to permit spring 100 to seat the supply valve 99, and will then fulcrum about their lower ends to permit release spring 104 to unseat release valve 103. Unseating of release valve 103 establishes communication between the chamber 98 and the atmosphere, by way of passages 113 and port 114.

If the chamber 98 is charged with fluid under pressure this will result in reducing the pressure in this chamber and the reduction will continue until the movable abutment 101 moves to the right under the gradually overpowering pressure of spring 102 for enough to seat the release valve 103. The reduction will then be terminated. It will, therefore, be seen that the reduction of pressure in chamber 98 depends upon the degree of movement of the carrier member 109 to the right.

For controlling this movement there is provided a cam 115 secured to a shaft 116 rotatable by a handle 117. This cam is so designed that as the handle 117 is moved into a "service zone", as indicated in Fig. 2—A, the carrier member 109 is permitted to progressively move to the right. For any one position of the handle 117 in the service zone, it follows that the pressure in chamber 98 will be established accordingly. Now the brake pipe 28 is connected to the chamber 98, as illustrated, so that the brake pipe will have the pressure therein reduced according to the degree of movement of the handle 117 into the service zone.

The brake valve device 29 is also provided with an emergency valve 118, which is urged toward a seated position by a spring 120. The cam 115 has a rising portion 121 thereon which is adapted to engage the stem of the valve 118 when the handle 117 is moved to the "emergency" position indicated in Fig. 2—A. The emergency valve 118 is then unseated to vent the chamber 98, and consequently brake pipe 28, to the atmosphere. The venting of the chamber 98 and the brake pipe past the release valve 103 is designed to take place at a service rate, while the venting past the emergency valve 118 is designed to take place at an emergency rate.

Connected to the brake pipe 28 are shown two brake pipe vent valve devices 124. These devices are preferably of the standard type well known and commonly used in automatic brake systems. As understood by those skilled in the art, these devices are unresponsive to brake pipe reductions at a service rate, but respond to brake pipe reductions at an emergency rate to open a communication through which the brake pipe is rapidly vented to the atmosphere. Thus if these devices are connected to the brake pipe at suitable points throughout a train, rapid serial venting of the brake pipe will result during an emergency application of the brakes.

Also connected to the brake pipe 28 is a conductor's valve device 125. This device is preferably of a standard type such as is well known in the art, its function being that upon manipulation of a handle 126 the brake pipe 28 is vented to the atmosphere at an emergency rate. It will thus be seen that the brake pipe may be initially vented by two manually operated means, namely, by the brake valve device 29, or by operation of the conductor's valve device 125.

The electroresponsive valve device 30 is embodied in a casing having two valves 128 and 129 secured to a common stem, and so arranged that as one valve is actuated to seated position the other is actuated to unseated position. The seating and unseating of the valves is controlled by an electromagnet 130 having a movable core 131 secured to a stem 132 which engages the stem of the two valves. The stem 132 has secured to its left end a piston 133, which is subject on its left side to pressure of fluid in a chamber 134, and on its right side to pressure of a spring 135.

The parts are so designed that when the pressure in chamber 134 is 100 pounds or more, the stem 132 will be actuated to the right to unseat valve 128 and seat valve 129. When the pressure in chamber 134 is reduced, and winding 130 at the same time energized to or above a predetermined degree, the stem 132 will remain in the position illustrated. If, however, the current in winding 130 should fall below the said predetermined degree then spring 135 will actuate piston 133 and stem 132 to the left to seat valve 128 and unseat valve 129.

The valve 128 controls communication between the aforementioned pipe 63, leading to the relay valve device 22, and the feed valve pipe 81, while the valve 129 controls communication between the pipe 63 and the control pipe 25. When valve 129 is seated, as illustrated, pipe 63 is connected to the feed valve pipe, and when valve 128 is seated pipe 63 is connected to the control pipe.

The valve device 30 is also provided with a movable abutment 137 which is urged to the right by spring 138, but normally held to the left when the pressure of fluid in chamber 139 to the right thereof is above 85 pounds. Chamber 139 is, as illustrated, connected to the brake pipe 28, so that for brake pipe pressures below 85 pounds spring 138 will shift the abutment 137 to the right. Attached to the abutment is a stem 140 which engages the piston 133, when shifted to the right, to prevent this piston from moving to the left for pressures in chamber 134 below 85 pounds. Thus during an emergency reduction in brake pipe pressure the stem 140 will function to hold the valve 129 seated, and the valve 128 unseated, for a purpose to be more fully described later.

The rheostat mechanism 31 comprises essentially a carbon pile type of rheostat 142, which is adapted to have the pressure on the plates therein, and hence the resistance, varied according to the pressure of fluid in a piston chamber 143. Pressure in this chamber acts upon a piston 144 to overcome the tension of a spring 145, and through a bell crank lever 146 to release pressure on a spring-biased stem 147 to decrease the pressure on the plates in the rheostat.

When the pressure in chamber 143 is diminished, spring 145 rotates the bell crank lever 146 in a counterclockwise direction, to increase the pressure on the plates of the rheostat, to thus decrease the resistance offered by the rheostat to flow of current therethrough.

The fluid pressure operated switch device 32 is embodied in a casing having a piston 148, subject on its left side to pressure of a spring 149, and on its right hand side to pressure from a chamber 150. When the pressure in chamber 150 is above 105 pounds, piston 148 will be actuated to the left to open contacts 151, and when the pressure in this chamber drops below 105 pounds spring 149 functions to close the contacts.

The motion detector devices 33 and 34 comprise, respectively, a relay and a motion detector device, the two being the same and cooperating in the manner as described in my copending application Serial No. 24,995, filed June 5, 1935, for Train brake apparatus. As described in that application, the detector device 34 functions above a predetermined train speed to prevent sufficient energization of the relay 33 to open its contacts 153, but when the speed of the train diminishes below this predetermined value the relay 33 is energized sufficiently to open its contacts.

These contacts control energization of a main contactor 155 in the circuit to the eddy-current brake device 15. Thus it will be seen that when the speed of the train is above a predetermined value, the main contactor 155 will be energized and when the speed diminishes below this value the main contactor will be deenergized.

On modern light weight, high speed trains the energy to propel the train is derived from a generator, indicated diagrammatically at 157, driven by a Diesel engine, indicated diagrammatically at 158. When the train is being propelled under power, a suitable switch, indicated diagrammatically at 159, is thrown to a position such as that illustrated in Fig. 2—A to supply current to a motor power circuit 160. When the brakes are to be applied, the switch 159 is thrown to a different position to supply power to a braking circuit 161. The diagrammatic showing of switch 159 is intended to be illustrative only, and is not intended to represent the actual type of switch employed, or the exact manner in which the power and braking circuits are connected to the supplying generator.

*Second articulated unit*

The second articulated unit is shown as comprising two cars 162 and 163. When operated as an independent train this unit is intended for passenger service only. Under the left or front end of the car 162 is provided a power truck indicated by the wheels 164, and connecting the two cars is an articulated truck indicated by wheels 165. At the rear end of the car 163 is an ordinary trailer truck 166. A brake cylinder 167 is provided for the friction brakes on the power truck indicated by wheels 164, and eddy-current brakes, indicated by winding 168, are also provided on this truck, as described for the first articulated unit.

For the articulated truck indicated by wheels 165, there is provided a brake cylinder 169, and for the last truck indicated by wheels 166 there is a separate brake cylinder 170. Since there is no car which carries a widely variable baggage or express load, as in the case of the first articulated unit, there is no necessity for a load compensating relay valve device 23. Ordinary relay valve devices 22 only therefore are required.

As will be observed from the illustration of the brake equipment in Fig. 2—B, for the second articulated unit, this equipment is essentially the same as that for the first articulated unit, with the exception that the load compensating relay valve device has been omitted, and the equipment adapted for a two car train instead of for a three car train. The parts of this equipment corresponding to those for the first articulated unit have been correspondingly numbered, so that further description of this equipment is unnecessary.

*Third articulated unit*

The third articulated unit comprises cars 172 and 173. This unit is intended solely as a powered trailer unit, to always be coupled to another unit, and for passenger service only. In this unit the power truck is at the rear of car 173 as indicated by the wheels 174. The two cars are coupled through an articulated truck, indicated by wheels 175, and the foremost truck, indicated by wheels 176, is the usual trailer type truck.

The brake equipment for this unit, as illustrated in the right hand portion of Fig. 2—C, is essentially the same as that shown in Fig. 2—B, except that no brake valve device 29 or retardation controller device 27 is provided, and the parts have been rearranged to show that the power truck is at the rear of the unit instead of at the front. A brake cylinder 177 is provided for the friction brakes on the power truck, as well as eddy-current brake devices as indicated by winding 179. A brake cylinder 180 is provided for the articulated truck indicated by wheels 175, and a brake cylinder 181 for the foremost truck indicated by wheels 176.

In the illustration of Figs. 2—B and 2—C, the Diesel engine 158, generator 157, and power switch 159 have been omitted, but it is to be understood that these are included in each of these equipments, and that the power switch 159 on the several articulated units is to be operated in synchronism as a part of the motor control mechanism, with which this invention does not deal.

*Pullman unit*

The Pullman unit comprises a single car 182, which is intended to be a standard car such as is originally used in Pullman service, with perhaps slight modification. The braking equipment for this car, as diagrammatically illustrated in Fig. 2—C, comprises the commercially and well known UC Universal valve, designated at 183, which has connected thereto three reservoirs, a service reservoir 184, an auxiliary reservoir 185, and an emergency reservoir 186. As is well known to those skilled in the art, the UC valve functions upon a service reduction in brake pipe pressure to supply fluid under pressure to a brake cylinder 187, from both the service reservoir 184 and the auxiliary reservoir 185. Upon an emergency reduction in brake pipe pressure the UC valve functions to supply fluid under pressure from all three reservoirs 184, 185 and 186 to the brake cylinder, to effect an emergency application to the brakes. The brakes are released by restoration of pressure in the brake pipe, all three reservoirs thereafter being recharged from the brake pipe.

Combination train

When the several units before described are coupled together the brake pipes 28 and train wires 190, 191 and 192 are connected as indicated in Fig. 1. In order that a unified control of the brake systems on the several units may be effected from the brake valve on the head end unit, it is necessary to provide on each unit having a brake valve device and a retardation controller device a cock 188 and a switch 178. As indicated in Fig. 2—B the cock 188 is turned to a position to isolate the brake valve device on this unit from the brake pipe, while the switch 178 is thrown to a position to isolate the retardation controller device on that unit. As indicated in Fig. 2—A, the cock 188 on the head end unit is turned to a position to connect the brake valve device to the brake pipe, and to isolate the coupler at the front end of the brake pipe from the remainder of the brake pipe. And switch 178 is thrown to a position to connect the retardation controller device on this unit to train wires 190 and 191. Train wire 192 connects to the battery 195 on this unit.

With the exception of the Pullman unit, each unit in the train functions to maintain its own equipment charged. That is, the compressors on all of the articulated units are maintained in operative condition so as to charge the respective main reservoirs 79. The brake pipe, and the reservoirs on the Pullman unit are, however, charged from the main reservoir on the first articulated unit.

The operation of this embodiment of my invention is as follows:

Running condition

When the train is running under power, or coasting, the operator maintains the brake valve handle 117, on the first unit, in release position. In this position of the handle, the supply valve 99 is maintained unseated while the release valve 103 is maintained seated. The brake pipe 28 is thus maintained connected to the feed valve pipe 81, so that the brake pipe will be charged to a pressure according to the setting of the feed valve device, which for the purpose of illustration will be taken as 110 pounds.

On each articulated unit the control pipe 25 will be charged from the feed valve pipe 81 through the application and release magnet valve device 26. The connected relay valve devices 22 and 23 will thus be maintained in their release position, so as to maintain the connected brake cylinder, or brake cylinders, in communication with the atmosphere.

The supply reservoirs 40 on each unit will be charged from the feed valve pipe 81 through a non-return check valve device 189. These check valve devices insure maintaining supply reservoir pressure in case the feed valve pipe on any one unit should become ruptured.

On the Pullman unit the three reservoirs indicated will be charged to brake pipe pressure through the UC valve 183.

With the brake pipe thus charged, each switch device 32 will maintain its contact 151 open, while each rheostat mechanism 31 will condition the associated rheostat 142 for a maximum resistance.

In each electroresponsive valve device 30, the pressure in chamber 134 will be at brake pipe pressure so that valve 129 will be seated and valve 128 unseated. The pressure in chamber 60 of the connected relay valve device 22 will then be at feed valve pipe pressure.

Service application

When it is desired to effect a service application of the brakes, the brake valve handle 117 on the head end unit is moved into the service zone to a degree according to the desired degree of application of the brakes. At the same time, or slightly before this operation, the power switch 159 is actuated to its lower position. This switch will ordinarily be coupled to the power controller (not shown), which when returned to off position shifts the switch from its upper to its lower position.

With the brake valve handle 117 in the service zone, the supply valve 99 will be seated and the release valve 103 unseated, to vent the brake pipe to the atmosphere. The resulting reduction in brake pipe pressure, as before explained, takes place at a service rate, the final brake pipe pressure corresponding to the position of the brake valve handle in the service zone.

Since the reduction of pressure in the brake pipe takes place at a service rate, the brake pipe vent valve devices 124 will not respond and will perform no function at this time.

In the retardation controller device 27 (on the first unit) the pressure in chamber 96 will diminish as the brake pipe pressure diminishes and piston 92 will move to the left to a corresponding degree. The contacts 93 and 94 will then be opened. Opening of contacts 93 opens the circuit from battery 195 to the train wire 191 and hence to the release electromagnet in each of the application and release magnet valve devices 26, while opening of contact 94 opens a similar circuit to the train wire 190 and hence to the application electromagnets. In each device, valve 76 will be then seated by the spring 78 while vent valve 75 will be unseated by spring 77. The control pipe 25 on each unit will then be disconnected from the feed valve pipe 81 and vented to the atmosphere through port 83.

As the pressure in each control pipe diminishes, each relay valve device 22 on each articulated unit, and the load compensating relay valve 23 on the first unit, will function to supply fluid under pressure to the connected brake cylinders.

At the same time, the reduction of pressure in the brake pipe causes contacts 151 of each switch device 32 to close, to complete a portion of the circuit to the eddy-current brake devices 15. It will be assumed that the speed of the vehicle is above a low predetermined value, so that each contactor 155 will have closed its contacts, as illustrated. Current will then flow from each generator 157 to the connected eddy-current brake winding 15. As this current flows through the rheostat 142, the value of this current will depend upon the resistance of this rheostat, which in turn is governed by the degree of brake pipe reduction.

Current flowing to the eddy-current brake winding on each unit flows through a resistance 193. The winding 130 of the associated electroresponsive valve device 30 is connected across this resistance and is consequently energized when current flows to the eddy-current brake devices. Therefore, as the pressure in chamber 134 diminishes, due to the reduction of pressure in the brake pipe, the magnetic effect of energizing winding 130 holds the valve 129 seated and valve 128 unseated. Chamber 60 in the connected relay valve device 22 will therefore be maintained at feed valve pressure, and fluid under pressure will not be supplied to the brake cylinder 14. It will thus be seen that upon initiating an application of the brakes by movement of the brake valve handle 117 into the service zone, the eddy-current brakes only will be applied on the power trucks, while the fluid pressure brakes will be applied on all other trucks, on each articulated unit in the train.

On the Pullman unit, the UC valve will function in response to the service reduction in brake pipe pressure to supply fluid under pressure to the brake cylinder 187 to a degree corresponding to the degree of brake pipe reduction.

As the train begins to decelerate the resulting force of inertia will urge the body 85 in the retardation controller device 27 (on the first unit) to the left. When the body has moved to a position such that contacts 94 are closed, the application electromagnets in each application and release magnet valve device 26 will again be energized to seat its valve 75. Further venting of each control pipe 25 will then be terminated, and the connected relay valve devices will assume a lap position.

If the rate of retardation should then further increase, the body 85 will continue to move further to the left, and close contacts 93. Closing of these contacts again energizes the release electromagnet in each magnet valve device 26, to unseat the associated valve 76. This will supply fluid under pressure to each control pipe 25, to effect a release of fluid under pressure from the brake cylinders. This release will, of course, continue until the rate of retardation drops sufficiently for the body 85 to move to the right far enough to again open contacts 93. The lap condition formerly obtaining will then again be effected.

A little thought will show that should the rate of retardation vary for any reason, the retardation controller device will function to increase or decrease the degree of application of brakes, as the case may be, to maintain the rate of retardation which was selected according to the brake pipe reduction effected.

As the speed of the train diminishes, a low speed will be reached at which the effectiveness of the eddy-current brakes begins to diminish, first slowly then rapidly. The motion detector devices 33 and 34 are designed to become operative at this time to open the contacts 153 and thus deenergize the eddy-current brake devices. This will in turn deenergize the winding 130 of the associated electroresponsive valve device 30, and as a consequence spring 135 will shift stem 132 to the left, to seat the valve 128 and unseat the valve 129. Chamber 60 in the connected relay valve device 22 will then be connected to the control pipe 25, and the pressure therein will reduce accordingly. Fluid under pressure will then be supplied to the connected brake cylinder. Thus as the eddy-current brakes on the power trucks are cut out of action, the fluid pressure brakes on these trucks are cut into action. This insures adequate braking at the end of the deceleration period.

When the train comes to rest, the force of inertia acting on body 85 in the retardation controller device 27 will diminish to zero, so that the body will be biased to its inoperative position by spring 86. If the brake valve handle 117 is then permitted to remain in the application position to which it has been moved, the electromagnets in the application and release magnet valve devices 26 will be deenergized, so that the control pipe 25 will be completely vented to the atmosphere. This will result in supplying fluid under pressure to all of the brake cylinders on the articulated units to a maximum degree, but this is not considered objectionable.

On the Pullman unit, however, the brake cylinder pressure will continue to be maintained according to the reduction in brake pipe pressure.

It is to be noted that the pressure to which the brake pipe is reduced will be maintained at a value corresponding to the brake valve handle position. If the pressure should tend to diminish, as due to leakage, then the movable abutment 101 in the brake valve device will be shifted to the right by spring 102 to unseat the supply valve 99. The brake pipe pressure will then be raised until the movable abutment is again shifted to the left to seat the supply valve. Thus brake pipe pressure will at all times correspond to brake valve handle position.

When it is desired to release the brakes, the brake valve handle is turned to the release position, in which position the supply valve 99 is unseated, as illustrated, to connect the brake pipe to the feed valve pipe. Brake pipe pressure is then increased and the connected devices are returned to their release position when the brake pipe pressure reaches 105 pounds or greater.

*Emergency application*

When it is desired to effect an emergency application of the brakes, this may be accomplished by movement of the brake valve handle 117 to emergency position, or by manipulation of the lever 126 of the conductor's valve device 125. In addition, an emergency application will result in case of rupture of the brake pipe at any point throughout the train.

Operation of the brake valve handle to the emergency position, or operation of conductor's valve 125, will vent the brake pipe to the atmosphere at an emergency rate, in which case the several brake pipe vent valve devices 124 will function to establish communication between the brake pipe and the atmosphere to quickly reduce the brake pipe pressure.

When the pressure in the brake pipe has fallen below 85 pounds the retardation controller device will have positioned its contacts 93 and 94 to their extreme left hand position. This position corresponds to the maximum permitted rate of retardation, and the brakes on each articulated unit will be applied to produce the maximum rate of retardation. On the Pullman unit, the UC valve will function to supply fluid under pressure to the brake cylinder 187 to a maximum degree.

On the articulated units, the eddy-current brakes only will be applied on the power trucks if switch 159 is in the lower position, and the fluid pressure brakes on all of the trailer trucks.

Figure 5:
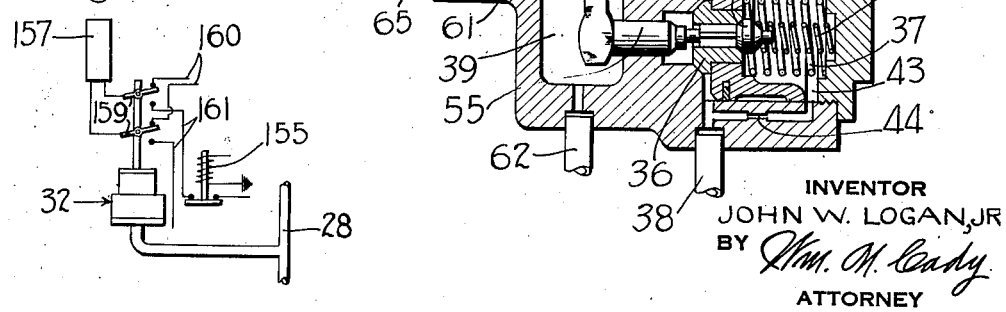
Fig. 5 is a fragmentary view showing schematically a modification of the control of the electric brake circuits.

It is of course preferred that the eddy-current brakes always be applied on the power trucks when effecting emergency applications. To provide for this I may have the switch 159 automatically thrown to its lower position when the brake pipe pressure is reduced below 105 pounds. One manner of accomplishing this is to combine the switch 159 with the brake pipe switch device 32, as is shown in Fig. 5. According to the arrangement shown, contacts 151 may be omitted and switch 159 may perform the function previously performed by these contacts. Whenever brake pipe pressure is above 105 pounds, switch 159 will be in its upper position, and below 105 pounds will be in its lower position. With this arrangement it is not necessary to interlock switch 159 with the motor controller.

From this point on, the operation of the equipment illustrated will be substantially as set forth for a service application, except however, that the brakes will be maintained applied to produce the maximum permitted rate of retardation.

When the train has been finally brought to rest, the brakes may be released by turning the brake valve handle 117 to release position, if the application was initiated through this means, or by returning handle 126 of the conductor's valve device to the illustrated position, if initiated through this means. In any event, when the brake pipe pressure is restored to normal the parts will return to the illustrated positions.

If the train should become disabled and it became necessary to tow it into a service shop, the handle of each of the cocks 194 on the articulated units is turned to the dotted line position, so as to connect each control pipe 25 to the brake pipe 28. The handle of cock 188 on the first unit is then turned to the position to connect the coupler to the brake pipe, so that it may be properly connected to the brake pipe on the towing vehicle. The brakes on the train may then be operated from the towing vehicle.

In the illustrated train combination of Fig. 1 I have shown the Pullman unit coupled between two articulated units. For this arrangement it is necessary that the Pullman unit be provided with train wires 190, 191 and 192. If, however, the Pullman unit be placed at the rear of the train these wires need not be provided on this unit, as will be obvious. The Pullman unit may therefore be placed wherever convenience and facilities make it desirable.

It will thus be seen that by embodying in suitable apparatus the principles of my invention, that a number of similar or dissimilar trains or train units may be coupled together and operated from one unit in a composite train. While I have illustrated my invention by a preferred embodiment thereof, it is not my intention to be limited to the details of this embodiment or otherwise than by the spirit and scope of the appended claims.

Having now described my invention, what I claim as new and desire to secure by Letters Patent, is:

1. In a combination train comprising a plurality of independent train units coupled together, in combination, a brake equipment for each of said train units comprising at least brake means for operating the brakes on that unit, a source of energy supply independent of the source of supply on any of the other train units, a pipe normally charged with fluid under pressure, means operating upon a reduction of pressure in said pipe for effecting operation of said brake means to apply the brakes, and operative upon an increase of pressure in said pipe for effecting operation of said brake means to effect a release of the brakes; means on one of said train units for maintaining said pipe normally charged with fluid under pressure and for effecting a reduction of pressure in said pipe; and means on one or more of said train units operating in response to reduction of pressure in said pipe for controlling the rate of retardation produced by operation of said brake means on each of said train units.

2. In a combination train comprising a plurality of independent train units coupled together, in combination, a brake equipment for each of said train units comprising at least brake means for operating the brakes on that unit, a source of energy supply independent of the source on any other units, a pipe adapted to be normally charged with fluid under pressure, means operative upon a reduction of pressure in said pipe for effecting operation of said brake means from said source of energy supply to apply the brakes, and for limiting the rate of retardation produced by operation of said brake means according to the degree of reduction of pressure in said pipe; and means on one of said train units for maintaining said pipe on each of said train units normally charged with fluid under pressure, and for reducing the pressure in said pipe on each train unit according to a desired degree of application of the brakes on each unit.

3. In a train system comprising a plurality of independent train units coupled together, in combination, a brake equipment for each of said train units comprising at least brake means for operating the brakes on that unit, a first pipe adapted to be normally charged with fluid under pressure, a second pipe also adapted to be normally charged with fluid under pressure, means operated upon a reduction of pressure in said second pipe for effecting operation of said brake means to apply the brakes, and means operated upon a reduction of pressure in said first pipe and controlled by the rate of retardation of the train for effecting and controlling reduction of pressure in said second pipe; and means on one of said train units for maintaining the said first pipe in each of said brake equipments normally charged with fluid under pressure, and for varying the pressure in said first pipe on each of said units according to a desired degree of application of the brakes.

4. In a train system comprising a plurality of independent train units coupled together, in combination, a brake equipment for each of said train units comprising at least brake means for operating the brakes on that unit, a first pipe adapted to be normally charged with fluid under pressure, a second pipe also adapted to be normally charged with fluid under pressure, means operated upon a reduction of pressure in said second pipe for effecting operation of said brake means to apply the brakes, and means operated upon a reduction of pressure in said first pipe and controlled by the rate of retardation of the train for effecting and controlling reduction of pressure in said second pipe; and control means on one of said train units for maintaining the said first pipe on each of said units normally charged with fluid under pressure, and having a control handle operable to effect a reduction of pressure in said first pipe on each of said train units according to the degree or extent of movement of said handle into an application zone.

5. In a train system comprising a plurality of independent train units coupled together, in combination, a brake equipment for each of said train units comprising at least brake means for operating the brakes on that unit, a first pipe adapted to be normally charged with fluid under pressure, a second pipe also adapted to be normally charged with fluid under pressure, means operated upon a reduction of pressure in said second pipe for effecting an operation to said brake means to apply the brakes, and means operated upon a reduction of pressure in said first pipe and controlled by the rate of retardation of the train for effecting and controlling reduction of pressure in said second pipe; and means on one of said train units for maintaining the said first pipe in each of said brake equipments normally charged with fluid under pressure, and for varying the pressure in said first pipe on each of said units according to a desired degree of application of the brakes; and means responsive to reduction of pressure in said first pipe for controlling the rate of retardation produced by application of said brake means.

6. In a train system comprising a plurality of independent train units coupled together, in combination, a brake equipment for one of said train units comprising a normally charged pipe and a valve mechanism operative upon a reduction of pressure in said pipe for effecting an application of the brakes on that unit; a second brake equipment for one or more of the other of said train units comprising two pipes, both of which are adapted to be normally charged with fluid under pressure, retardation controlling means operative responsive to the reduction of pressure in one of said pipes for effecting and controlling variations of pressure in the other of said pipes, means responsive to variations of pressure in the said other of said pipes for effecting and controlling the degree of application of the brakes on that same unit; means on one of said units for maintaining the brake pipe on each of said train units normally charged with fluid under pressure, and being operable to effect a reduction of pressure in said brake pipe on each of said train units to a degree according to the degree or extent of movement of a control handle on the first train unit.

7. In a train brake system, in combination, brake means for each car in the train for operating the brakes on that car, a first normally charged pipe adapted to extend throughout the entire train, a second normally charged pipe adapted to extend between at least two or more cars, valve means on one car in the train having a control element and being operable to effect a reduction of pressure in said first pipe according to the degree or extent of movement of said control element into an application zone, means responsive to reduction of pressure in said first pipe for effecting a reduction of pressure in said second pipe, and means responsive to a reduction of pressure in said second pipe for effecting the operation of said brake means on the cars associated with said second pipe, to apply the brakes on said cars to a degree corresponding to the degree of reduction of pressure in said second pipe.

8. In a vehicle brake system, in combination, brake means for operating the brakes, a first pipe adapted to be normally charged with fluid under pressure, a second pipe also adapted to be normally charged with fluid under pressure, retardation control means operative upon a reduction of pressure in said first pipe for effecting a reduction of pressure in said second pipe and for varying the pressure in said second pipe subsequently according to a selected rate of retardation, and means operative upon a reduction of pressure in said second pipe for effecting operation of said brake means to apply the brakes, and for controlling the degree of application according to variation of pressure in said second pipe.

9. In a vehicle brake system, in combination, brake means for operating the brakes, a brake pipe adapted to be normally charged with fluid under pressure, a control pipe also adapted to be normally charged with fluid under pressure, retardation control means having an element operative upon reduction of pressure in said brake pipe for effecting a reduction of pressure in said control pipe, and also having an element responsive to rate of retardation of the vehicle for subsequently controlling variations of pressure in said control pipe, and means operative upon reduction of pressure in said control pipe for effecting operation of said brake means to apply the brakes, and subsequently responsive to variations of pressure in said control pipe for operating said brake means to vary the degree of application of the brakes.

10. In a vehicle brake system, in combination, brake means for operating the brakes, a brake pipe, a control pipe, a retardation controlling means having movable contacts operative upon a reduction of pressure in said brake pipe for effecting a reduction of pressure in said control pipe, and having a body responsive to the rate of retardation of the vehicle for subsequently actuating said contacts to vary the pressure in said control pipe, means responsive to an initial reduction of pressure in said control pipe for effecting operation of said brake means to apply the brakes, and responsive subsequently to variations of pressures in said control pipe for operating said brake means to vary the degree of application of the brakes.

11. In a vehicle brake system, in combination, a fluid pressure brake device, electric brake means, a brake pipe, a control pipe, means operative upon a reduction of pressure in said brake pipe for effecting operation of said electric brake means, means also operative upon the same reduction of pressure in said brake pipe for effecting a reduction of pressure in said control pipe, and means operative upon a reduction of pressure in said control pipe for effecting operation of said fluid pressure brake device.

12. In a vehicle brake system, in combination, a fluid pressure brake device, electric brake means, a first pipe adapted to be normally charged with fluid under pressure, a second pipe adapted to be also normally charged with fluid under pressure, means operative upon a reduction of pressure in said first pipe for effecting operation of said electric brake means, retardation control means operative upon the same reduction of pressure in said first pipe for effecting a reduction of pressure in said second pipe and for subsequently varying the pressure therein according to a selected rate of retardation, and means operative upon a reduction of pressure in said second pipe for effecting operation of said fluid pressure brake device and for subsequently controlling the degree of operation according to variations of pressure in said control pipe.

13. In a vehicle brake system, in combination, an electric brake device, a fluid pressure operated brake device, a brake pipe, a control pipe, means operative upon a reduction of pressure in said brake pipe for effecting operation of said electric brake device to produce a braking effect, means operated upon a reduction of pressure in said brake pipe for effecting a reduction of pressure in said control pipe, means operated upon a reduction of pressure in said control pipe for effecting operation of said fluid pressure brake device to produce a different braking effect, and means for preventing effective operation of said fluid pressure brake device so long as the operation of said electric brake device is effective in producing a braking effect above a chosen degree.

14. In a vehicle brake system, in combination, electric brake means, a fluid pressure operated brake means, a brake pipe, a control pipe, means operative upon a reduction of pressure in said brake pipe for effecting operation of said electric brake means, a retardation controlling mechanism also operative upon the same reduction of pressure in said brake pipe for effecting a reduction of pressure in said control pipe and for subsequently controlling the pressure in said control pipe according to a selected rate of retardation, means operated upon a reduction of pressure in said control pipe for effecting operation of said fluid pressure operated brake means, and operative to control the degree of operation thereof according to variations of pressure in said control pipe.

15. In a train having both power and trailer trucks, in combination, electric brake means associated with said power trucks, fluid pressure operated brake means associated with both the power trucks and trailer trucks, a first pipe adapted to be normally charged with fluid under pressure, a second pipe also adapted to be normally charged with fluid under pressure, means operative upon a reduction of pressure in said first pipe for effecting operation of said electric brake means, retardation controlling means operative upon a reduction of pressure in said first pipe for effecting a reduction of pressure in said second pipe and for thereafter varying the pressure in said second pipe according to a selected rate of retardation, means operative upon a reduction of pressure in said second pipe for effecting operation of said fluid pressure operated brake means on all of said trucks, and for varying the degree of application of said fluid pressure operated brake means according to variations of pressure in the control pipe, and means controlled according to the effectiveness of said electric brake means for suppressing the operation of said fluid pressure operated brake means on said power trucks until the effectiveness of said electric brake means has diminished below a predetermined degree.

16. In a vehicle brake system, in combination, a plurality of brake operating devices, a brake pipe, a control pipe, means operated upon the reduction of pressure in said brake pipe for effecting a reduction of pressure in said control pipe, a first valve means operated upon a reduction of pressure in said control pipe for effecting operation of certain of said brake devices according to the degree of reduction of pressure in said control pipe, and a second valve means also operative upon reduction of pressure in said control pipe for effecting operation of other of said brake means both according to the degree of reduction of pressure in said control pipe and according to the load on the wheels or axles with which said other brake means is associated.

17. In a vehicle brake system, in combination, brake operating means, a pipe adapted to be normally charged with fluid under pressure, a retardation controller device having contacts adapted to be operated upon a reduction of pressure in said pipe, and having a body responsive to the rate of retardation of the vehicle for also operating said contacts, means responsive to operation of said contacts in response to reduction of pressure in said pipe for effecting operation of said brake operating means and responsive to operation of said contacts by said body for controlling the degree of operation of said brake operating means.

18. In a vehicle brake system, in combination, brake operating means, a normally charged pipe, a retardation controller device having normally closed contacts adapted to be actuated upon reduction of pressure in said pipe to a position where said contacts are opened, and having a body responsive to the rate of retardation of the vehicle for subsequently closing said contacts at a rate of retardation corresponding to the degree of reduction of pressure in said pipe, and means responsive to opening of said contacts for effecting operation of said brake operating means and responsive to closing of said contacts for effecting a release operation of said brake operating means.

19. In a vehicle brake system, in combination, an electric brake means for producing a braking effect on the vehicle, a fluid pressure brake operating means for operating a brake to also produce a braking effect on the vehicle, means for effecting operation of the electric brake means, means for effecting operation of the fluid pressure brake operating means, means governed by the rate of retardation of the vehicle for limiting the degree of operation of one of said two brake means, a normally charged pipe, and means for controlling said retardation means according to the degree of reduction of pressure in said pipe.

20. In a vehicle brake system, in combination, an electric brake means, a fluid pressure brake means, means for effecting operation of the electric brake means, means for effecting operation of the fluid pressure brake means, means operated according to the rate of retardation of the vehicle for limiting the degree of operation of the fluid pressure brake means, and means for controlling said retardation controlling means according to reductions of pressure in said normally charged pipe.

21. In a vehicle brake system, in combination, an electric brake means, fluid pressure brake means, means for effecting operation of the electric brake means, a retardation controller device having a first means operable to effect operation of the fluid pressure brake means and a second means operable subsequently according to the rate of retardation of the vehicle for controlling the degree of operation of the fluid pressure brake means, a normally charged pipe, and means governed by the degree of reduction of pressure in said pipe for operating said retardation controller first means.

22. In a vehicle brake system, in combination, electric brake means, fluid pressure brake operating means, a normally charged pipe, means for supplying current to effect operation of said electric brake means according to the degree of reduction of pressure in said pipe, contacts positionable according to a desired rate of retardation, means for positioning said contacts according to the degree of reduction of pressure in said pipe, means responsive to positioning of said contacts for effecting operation of said fluid pressure brake operating means, and means operative according to the rate of retardation of the vehicle for subsequently operating said contacts to control the degree of operation of said fluid pressure brake operating means.

23. In a vehicle brake system, in combination, electric brake means, fluid pressure brake operating means, valve means normally biased to a position to prevent operation of said fluid pressure brake operating means, and operative upon a reduction of pressure to permit operation of said fluid pressure brake operating means, means for effecting operation of said electric brake means, means for effecting a reduction of pressure in said valve means, and means responsive to the operation of said electric brake means for preventing the reduction of pressure in said valve means shifting said valve means from its biased position to the position permitting operation of said fluid pressure brake operating means.

24. In a vehicle brake system, in combination, electric brake means, fluid pressure brake operating means, a pipe normally charged with fluid under pressure, means operative upon a reduction of pressure in said pipe for effecting operation of said electric brake means, a valve device having a biased position in which operation of said fluid pressure brake means is prevented and being operative upon reduction of pressure in said pipe to be shifted from said biased position to permit operation of said fluid pressure brake operating means, and electrical means responsive to operation of said electric brake means for preventing operation of said valve device from said biased position so long as said electric brake means is effective above a predetermined degree.

25. In a vehicle brake system, in combination, a brake cylinder, a movable abutment subject on one side to pressure of a spring and on the other side to pressure of fluid in a chamber, valve means operated by said movable abutment upon reduction of pressure in said chamber for effecting a supply of fluid under pressure to said brake cylinder, and a second movable abutment subject both to brake cylinder pressure and to the pressure of fluid in said chamber for operating said valve means to cut off said supply to said brake cylinder when brake cylinder pressure corresponds to the degree of reduction of pressure in said chamber.

26. In a vehicle brake system, in combination, brake operating means, a movable abutment subject on one side to pressure of fluid in a chamber and on the other side to pressure of a spring, a lever actuable by said movable abutment, a movable fulcrum for said lever, and a valve mechanism operable by said lever for controlling operation of said brake operating means.

27. In a vehicle brake system, in combination, a brake cylinder, a movable abutment subject on one side to pressure of fluid in a chamber and on the other side to pressure of a spring, and operable upon reductions of pressure in said chamber to be shifted by said spring to various positions, valve means for controlling supply of fluid under pressure to and its release from said brake cylinder, an element adapted to be positioned according to the load on the vehicle, and means governed by the position of said element and movement of said abutment for controlling operation of said valve means.

28. In a retardation controller mechanism, in combination, a set of contacts having a biased position and being adapted to be moved to different positions corresponding to a selected rate of retardation, means operated upon a decrease of fluid pressure for moving said set of contacts, and a body having a biased position and being adapted to be operated by a force of inertia to actuate said contacts when positioned by said last mentioned means.

29. In a retardation controller mechanism, a set of movable contacts, an abutment subject on one side to pressure of fluid in a chamber and on the other side to pressure of a spring, and operated upon a decrease of pressure in said chamber for moving said contacts from a biased position to a position corresponding to the reduction of pressure in said chamber, and a body adapted to be actuated by a force of inertia to subsequently actuate said contacts.

JOHN W. LOGAN, JR.